D. B. SMITH.
Plow.
No. 162,962. Patented May 4, 1875.
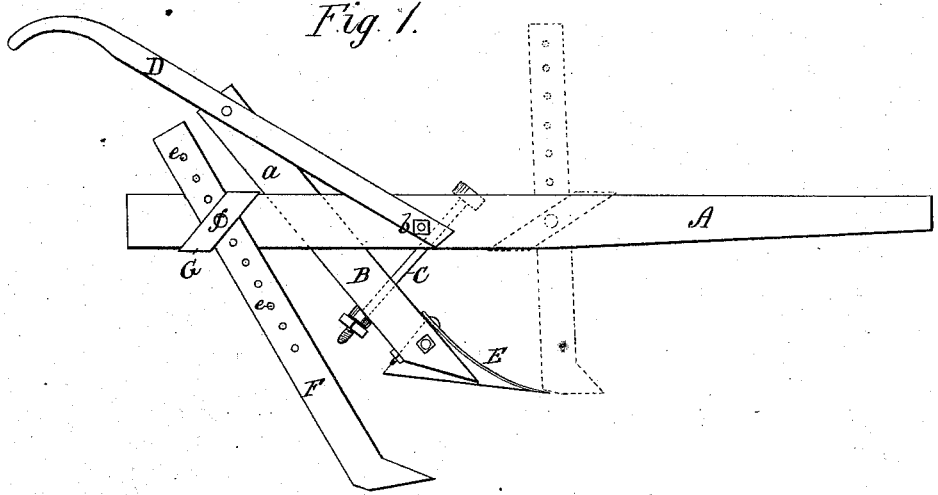
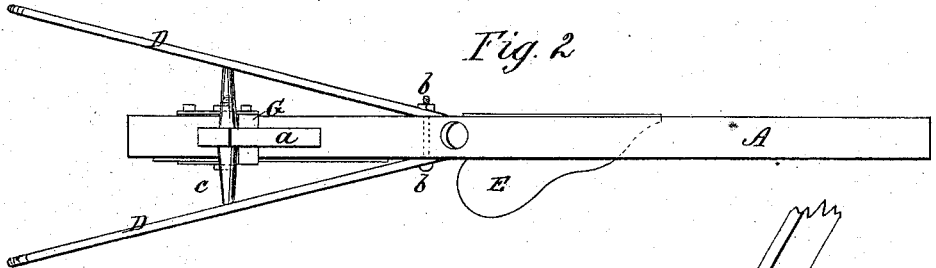
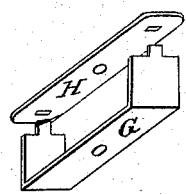
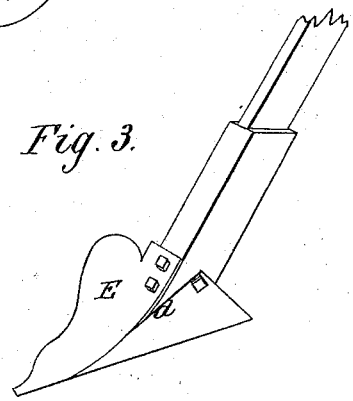
WITNESSES:
W. W. Hollingsworth
John Kernon
INVENTOR:
David B. Smith
BY
ATTORNEYS.

UNITED STATES PATENT OFFICE.

DAVID BURREL SMITH, OF BASTROP, LOUISIANA.

IMPROVEMENT IN PLOWS.

Specification forming part of Letters Patent No. 162,962, dated May 4, 1875; application filed April 6, 1875.

*To all whom it may concern:*

Be it known that I, DAVID BURREL SMITH, of Bastrop, in the parish of Morehouse and State of Louisiana, have invented a new and Improved Plow; and I do hereby declare that the following is a full, clear, and exact description of the same, reference being had to the accompanying drawing, forming a part of this specification, in which—

Figure 1 is a side elevation; Fig. 2, a plan view; Fig. 3, a perspective view of the plow and standard; Fig. 4, detail view of clamp.

This invention relates to certain improvements in plows; and it consists in such a construction and arrangement of parts as will first be fully described and then pointed out in the claim.

In the drawing, A represents the beam of the plow, and B the stock or standard, to which the mold-board is attached. Said standard is inclined forwardly, and is fastened to the beam by a diagonal mortise, through which the tenon $a$ of the standard passes, and also by a bolt, C, which subtends the angle formed by the standard and beam, and strengthens and braces both beam and standard. D are the handles, which are bolted to the beam at $b$ and fastened to a round $c$, which connects them and also holds and braces them in their proper positions, by being passed through an extension of the tenon $a$. E is the plowshare, which consists of a single piece of wrought-iron of about five-eighths of an inch thick, slitted at $d$, and bent around to form the land-side, which is bolted to the standard, the share E being also bolted to the standard in such a manner as to be readily detachable for the substitution of a bull-tongue, buzzard-wing, cotton-scraper, or any other form of plow which may be desirable. F is an adjustable subsoil-plow which is attached to the rear extension of the beam. Said plow or foot has a flat shank, perforated with holes $e$ for adjusting the same with respect to depth, and its foot which cuts the subsoil in the bottom of the furrow is made a little thicker than the shank and tapers to a point. The said plow F is fastened to the rear extension of the beam by means of a strap, G, which passes diagonally across the beam and the shank of the plow, and also by a bolt, $f$, which passes through said strap and shank and a detachable plate, H, on the other side. The top and bottom horizontal portion of the strap act as brace to the shank of the plow when the same is pressed backward by the advance movement of the plow in the ground, and the diagonal arrangement of the strap allows the plow and its shank to be disposed longitudinally with the beam, when not used. The detachable nature of the strap, its plate H, and the bolt, also admit of the subsoilers being taken from the rear extension of the beam and fastened in advance of the furrow-plow by the same bolt $f$, and a hole, $g$, in which position it is adjusted to act as a colter.

Having thus described my invention, what I claim as new is—

The combination, with the subsoil-plow having its shank perforated with adjusting-holes of the diagonal strap G, detachable plate H, and central bolt $f$, substantially as and for the purpose described.

DAVID BURREL SMITH.

Witnesses:
T. P. SIMPSON,
CHAS. A. PETTIT.